United States Patent
Suzuki

(10) Patent No.: US 6,627,276 B1
(45) Date of Patent: Sep. 30, 2003

(54) CUSHIONING MATERIAL

(75) Inventor: Ken-ichi Suzuki, Tokyo (JP)

(73) Assignee: Tsukasa Kasei Kogyo K.K., Tokyo (JP)

( * ) Notice: Subject to any disclaimer, the term of this patent is extended or adjusted under 35 U.S.C. 154(b) by 0 days.

(21) Appl. No.: 09/619,649

(22) Filed: Jul. 19, 2000

(30) Foreign Application Priority Data

Oct. 21, 1999 (JP) .......................................... 11-008001
Nov. 9, 1999 (JP) .......................................... 11-008541

(51) Int. Cl.[7] .................. B65D 81/03; B65D 30/00; B32B 3/26
(52) U.S. Cl. .................. 428/35.2; 428/35.5; 428/158; 428/194; 383/207; 229/87.02
(58) Field of Search .................. 428/35.2, 35.5, 428/166, 158, 194; 383/207; 229/87.02; 206/521, 531, 534

(56) References Cited

U.S. PATENT DOCUMENTS

| | | | | |
|---|---|---|---|---|
| 5,772,330 A | * | 6/1998 | Bang et al. | 150/154 |
| 5,964,534 A | * | 10/1999 | Welles | 229/87.08 |
| 6,060,095 A | * | 5/2000 | Scrimager | 219/729 |
| 6,155,423 A | * | 12/2000 | Katzner et al. | 206/531 |

\* cited by examiner

Primary Examiner—Rena L. Dye
(74) Attorney, Agent, or Firm—Oblon, Spivak, McClelland, Maier & Neustadt, P.C.

(57) ABSTRACT

A tube-shaped cushioning material in which an air bag is continuously connected in line or mat-shaped cushioning material in which an air bag is continuously connected in two dimensions, in which a cutout notch is formed at a given space or continuously in a side edge and/or connecting part of the air bag, thereby facilitating a separating-dividing operation of the air bag in a size suitable for an article to be packed and a volume reduction operation of the air bag discarded after opening a package.

4 Claims, 8 Drawing Sheets

CUSHIONING MATERIAL

BACKGROUND OF THE INVENTION

1. Field of the Invention

This invention relates to a cushioning material for packing comprising an air bag made of heat-fusible laminated film which is divided in a form of rectangle and continuously connected in a foam of tube or mat.

2. Description of the Prior Art

In order to wrap a package or fill around a packed article, a cushioning material has been used which is made of an air bag (air-filled chamber) made of synthetic resin continuously connected in a form of tube or mat. As shown in FIG. 8, an example of the mat-shaped cushioning material is formed by superimposing oppositely two sheets of laminated films the fusion temperatures of inner and outer surfaces of which are different, dividing in a form of rectangle by means of welding by plural first and second rectangular sealing lines 5, 6, connecting continuously its inside in two dimensions to form air bags 10, and it is used by dividing in required size and shape along a perforated line M perforated in the second sealing line 6 corresponding to an article to be packed.

The first sealing line is formed lengthwise by means of roller-heating when the cushioning material is produced, and the second sealing line is formed wide accompanying with a strap-shaped non-sealed area between two parallel sealing lines, and a perforated line M is formed in the non-sealed area.

However, as a heat-fusible film used for the cushioning material of this type is used a laminated film having no directional property formed by laminating films having no directional property in order to give uniform strength in all directions of the laminated film. Therefore, when tearing the cushioning material of this type from its side edge in the direction of the arrow A along the perforated line, there occurs frequently a case where the tearing portion B departs from the perforated line, thereby tearing an air bag. And accordingly, tearing work must be carried out carefully and cautiously.

Furthermore, since volume reduction work has been required after opening a package in order to reduce the bulk of the cushioning material in which each of the air bag is punctured by a tip of, for example, ball-point pen and the like to press air out of the air bag, the work takes a lot of time and is poor efficient; such properties and defects are true for the tube-shaped cushioning material.

SUMMARY OF THE INVENTION

According to this invention, there is provided a tube-shaped or mat-shaped cushioning material in which air bags can be cut off easily without recourse to perforated line, thereby making the packaging-charging work efficient and carrying out easily the volume-reducing work after opening a package by similar operation.

According to this invention, there is provided a cushioning material having air bags divided and continuously connected by rectangular first and second sealing lines, in which a cutout making serve a double purpose of cutting off and tearing is formed continuously or at a given space in at least one side edge of a film constituting the cushioning material or at least one side of a rectangular air bag, thereby performing each of cutting-off of the air bag at the time of the packing operation and the volume reduction operation at the time of opening a package, continuously.

According to a first aspect of this invention, there is provided a cushioning material made of heat-fusible laminated film comprising an air bag which is divided in a form of rectangle and continuously connected in a form of tube or mat, in which a cutout or V-shaped notch for tearing the air bag is formed continuously or in a given space to at least one side edge of the laminated film.

According to a second aspect of this invention, there is provided a cushioning material made of heat-fusible laminated film comprising an air bag which is divided in a form of rectangle and continuously connected in a form of tube or mat, in which a tearing cutout or V-shaped notch is formed continuously or in a given space to at least one side of the air bag.

In the invention of the second aspect of this invention, the cutout or V-shaped notch itself may be formed by a perforated line.

According to a third aspect of this invention, there is provided a cushioning material made of heat-fusible laminated film comprising an air bag which is divided in a form of rectangle and continuously connected in a form of tube or mat, in which one of rectangular sealing lines dividing the air bag is formed by two parallel sealing area putting a non-sealed area between them and a V-shaped notch making serve a double purpose of separating and tearing the air bag is formed in the non-sealed area.

In the invention of the third aspect of this invention, the cutout or V-shaped notch itself may be formed by a perforated line.

According to this invention, when a cutout making serve a double purpose of cutting off and tearing is formed to at least one side of the rectangle-shaped air bag, serrated cutouts or V-shaped cutout (notch) may be perforated in a part or whole area of the non-sealed area in the sealing line with or without a perforated line.

The terminology "cutout" used herein means a single or serrated cutout of straight cutout and V-shaped cutout (notch).

BRIEF DESCRIPTION OF THE DRAWINGS

For a more complete understanding of this invention may be had to the following detailed explanations in connection with the accompanying drawings, in which.

DESCRIPTION OF THE PREFERRED EMBODIMENTS

Examples of this invention are described in more detail on the basis of figures. FIGS. 1 to 4 show a mat-shaped cushioning material. In FIGS., 1, 2 are non-directional heat-fusible laminated films, 3, 4 are side edges of a superimposed film, 5a is an outermost first sealing line, 6 is a second sealing line and is provided with two parallel sealed part 7, 8 and middle non-sealed area 9 except for a case shown in FIG. 1.

Figure 1:
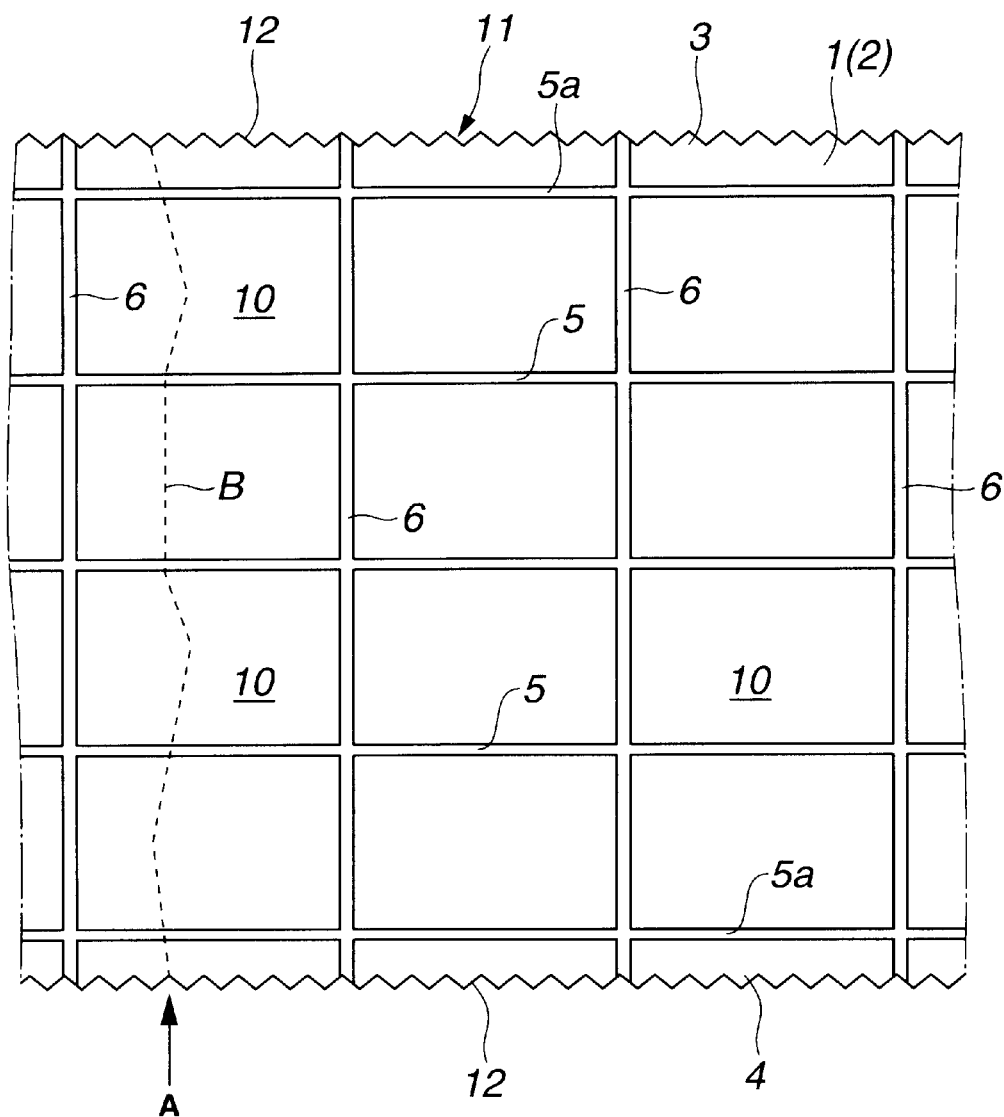
FIG. 1 is a plan view of a cushioning material of this invention.
Figure 2:
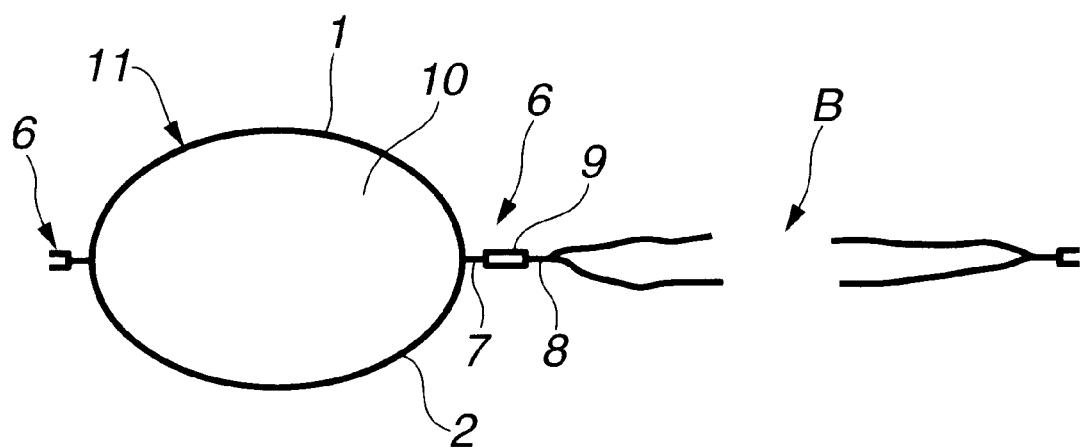
FIG. 2 is a cross-sectional view showing an air bag and a state in which its volume is reduced.

10 is a divided air bag (air chamber) in which air is trapped, and has a cross section shown in FIG. 2 and is continuously connected through a second sealing line 6 to form a mat-shaped cushioning material 11. 12 are serrated notches formed continuously to the side edges 3, 4 of the cushioning material and may be formed in a given space.

This cushioning material can be torn easily from a valley A of the notch 12 by force of a fingertip. The cleft B travels as shown by a broken line in FIG. 1 bursting in turn air bags 10 of a first line and brings to a state shown at right in FIG. 2, thereby performing volume reduction and separation of the air bags at the same time.

Such an operation as described above may be applied also to a volume reduction operation of the cushioning material after opening a package, thereby reducing the volume of the continuously connected air bag 10 to evacuate by a single action for each line.

Figure 3:
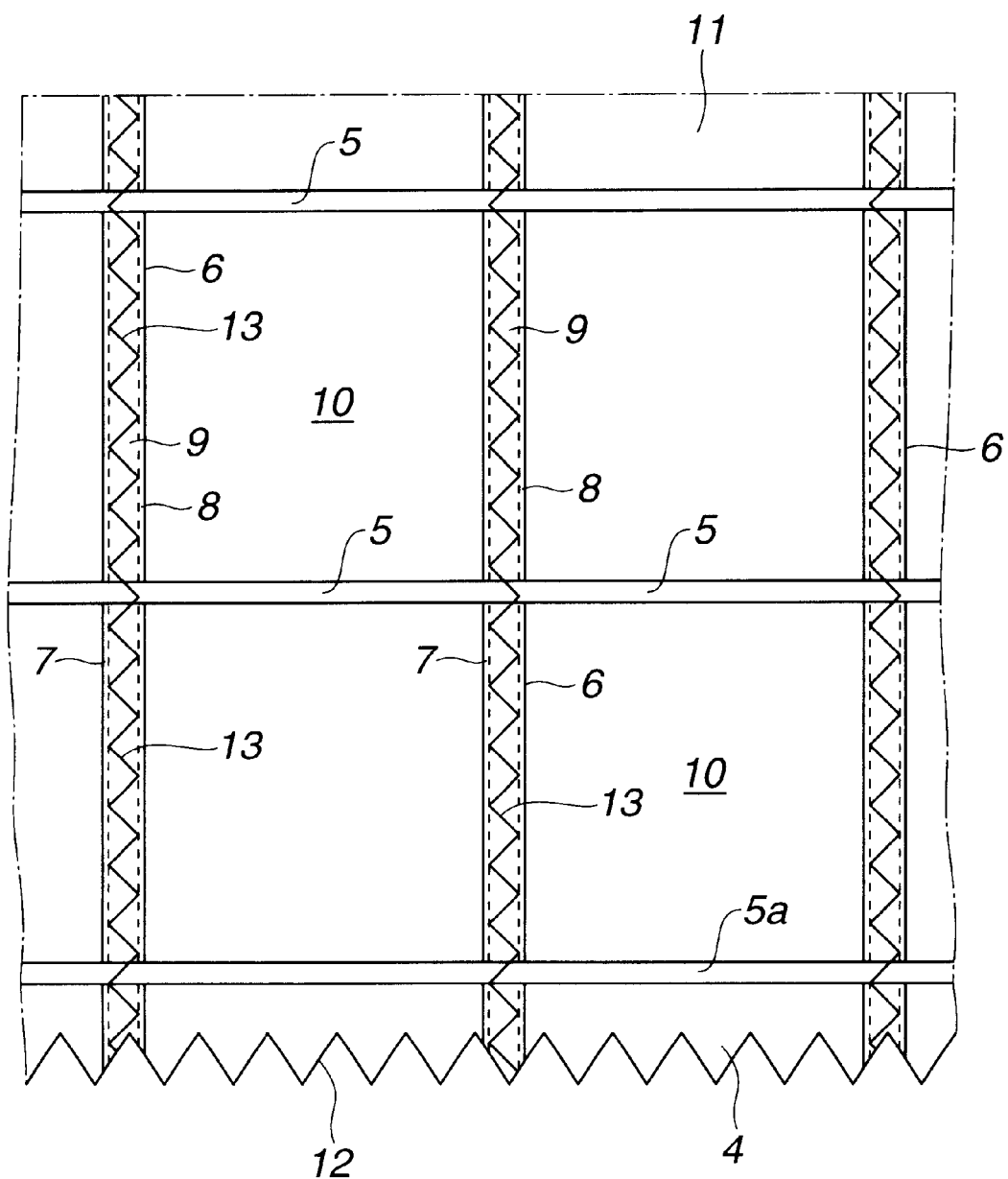
FIG. 3 is an enlarged plan view of a second sealing line.
Figure 4:
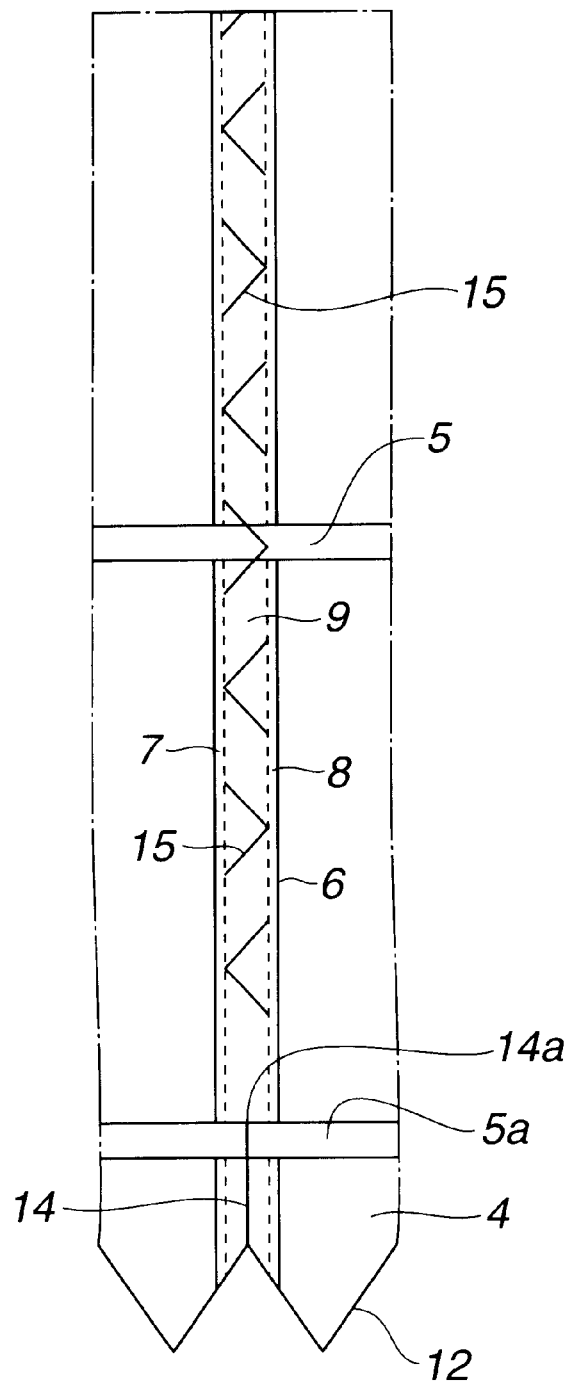
FIG. 4 is a plan view of a main part showing another example of structure of a second sealing line.

FIG. 3 shows an example in which a serrated cutout 13 is formed in the non-sealed area 9 and FIG. 4 shows an example in which a V-shaped cutout 15 is formed with the direction changed alternately in place of the serrated cutout. Both examples shown by FIGS. 3 and 4 can facilitate an operation performing double purpose of lateral continuous volume reduction and separation.

14 is a cutout exclusively used for separating, the tip 14*a* of which is made to exceed the outermost first sealing line 5*a* or at least to enter the outermost first sealing line 5*a* from side edges 3, 4 inside the non-sealed area 9.

Figure 5:
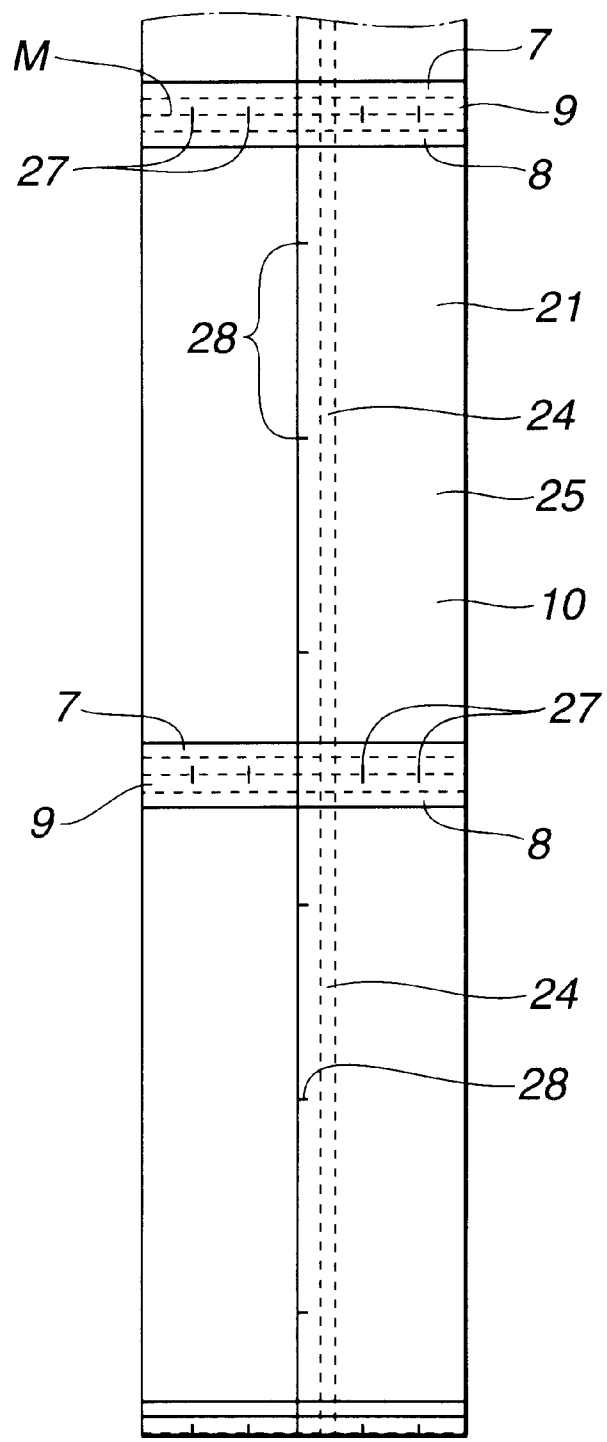
FIG. 5 is a side view of a main part of a tube-shaped cushioning material.
Figure 6:
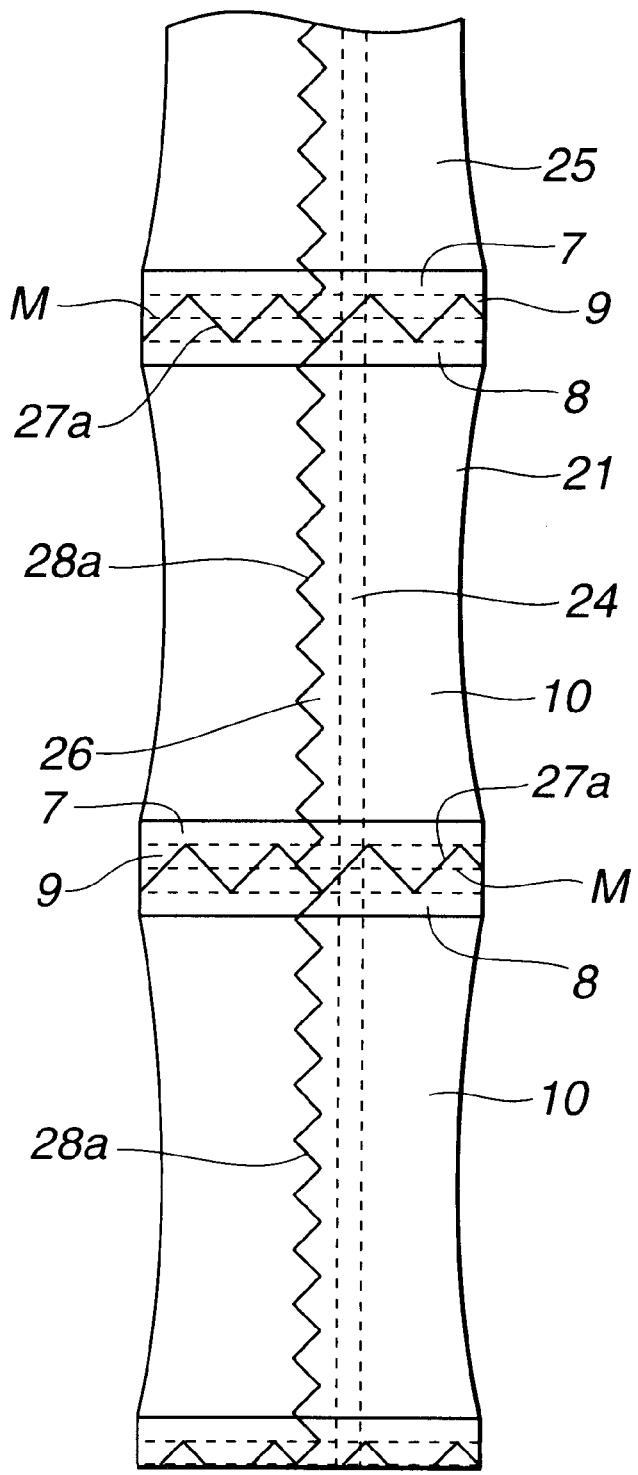
FIG. 6 is a side view of another example.
Figure 7:
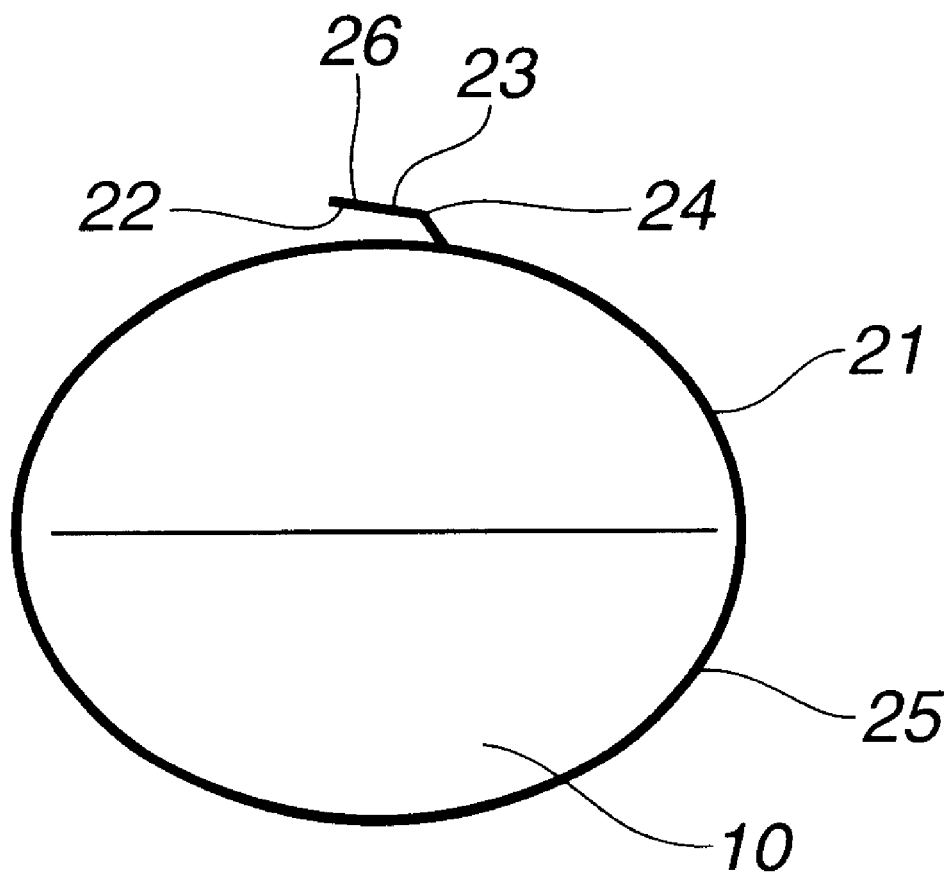
FIG. 7 is a cross-sectional view showing a body of air bag.
Figure 8:
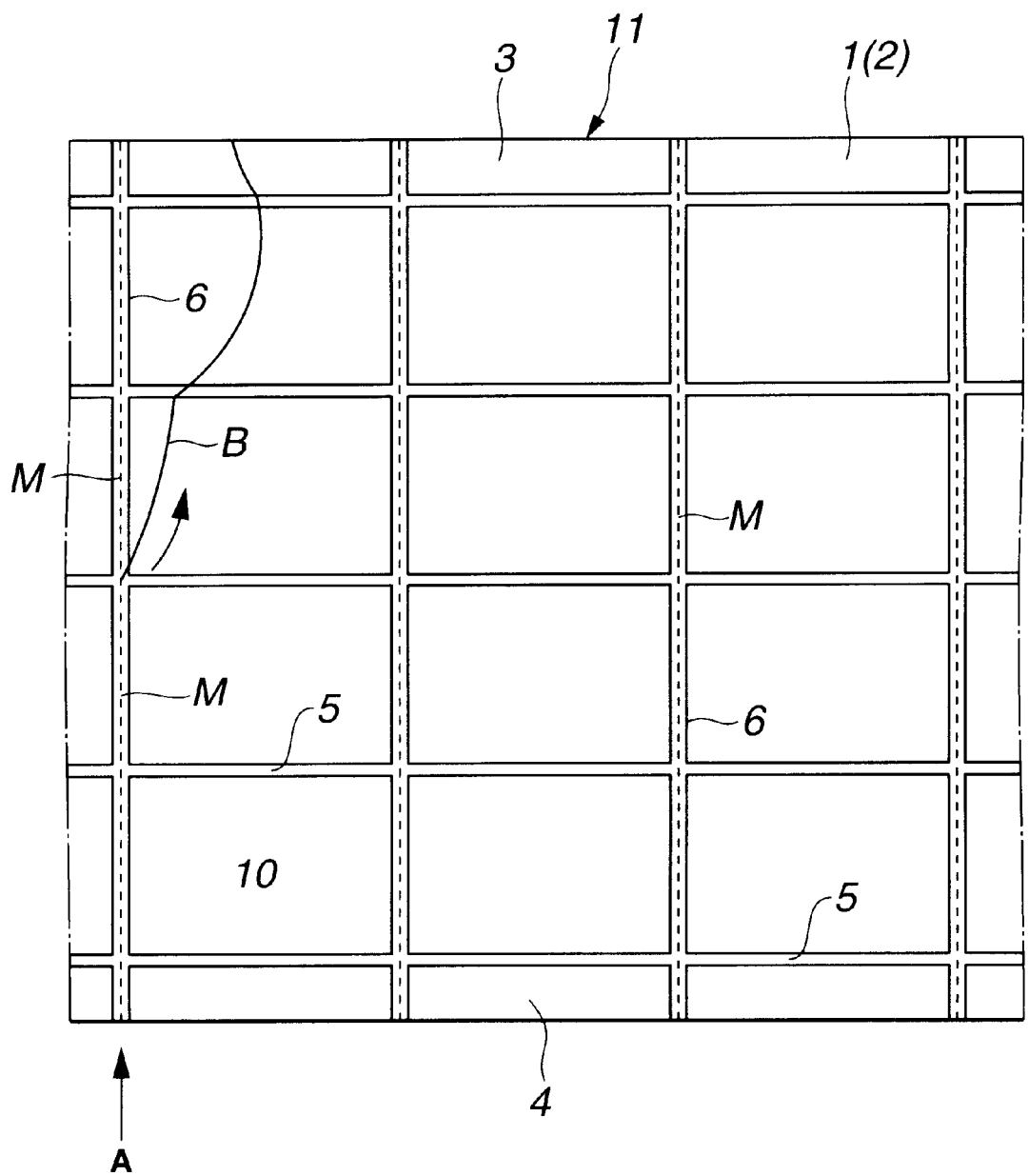
FIG. 8 is a plan view showing a conventional cushioning material.

FIGS. 5 to 7 show an example of a tube-shaped cushioning material in which air bags are continuously connected in the shape of tube. In FIG. 5, 21 is a sheet of film, and inner surfaces of both side edges 22, 23 of the film are superimposed and heat-fused (heat-sealed) 24 to form a tube-shaped cushioning material 25 in which air is trapped. 26 is an exterior edge of film. Each air bag 10 is divided by a two parallel sealed part 7, 8 corresponding to a second sealing line and non-sealed area 9 and continuously connected. M is a perforated line for cutting off formed in non-sealed area 9, and 27 is a cutout for volume reducing and tearing formed so as to stride over the perforated line. The perforated line M and cutout 27 are formed at the same time. 28 is a cutout exclusively used for volume reduction formed in the exterior edge 26 and is formed previously in the film or formed simultaneously with seal 24 of tube 25. While there occurs a case where the position of the notch is displaced when the notch is formed previously in the film exterior edge 26, tearing effect changes hardly.

FIG. 6 shows a cushioning material in which serrated notches 27*a*, 28*a* are continuously formed in the film exterior edge 26 and non-sealed area 9, respectively and can perform volume reduction and tearing work more easily.

It goes without saying that the cutout formed in non-sealed area 9 must be formed to such an extent that the continuously connected air bags are not separated easily thereby.

The cushioning material of this invention can facilitate tearing and separating of the continuously connected air bags by notches for cutting off and makes smooth work possible regardless of the presence or absence of perforated line at the time of packaging, and can reduce continuously the volume of each air bag in both directions of lengthwise and crosswise directions by notches for volume reduction and tearing formed to one side of the continuously connected air bags taken out when opening the package.

The cushioning material of this invention does not require an air evacuating operation because the volume reduction of the air bag can not be carried out by a conventionally used means, that is, forming a small hole by a pen tip, but carried out without a tool, and can improve remarkably the package-opening operation because the air bag becomes a mere film chip simultaneously with tearing, thereby facilitating disposal including transportation and the like.

What is claimed is:

1. A cushioning material made of heat-fusible laminated film comprising a series of air bags which are divided into rectangles and continuously connected so as to form a mat, wherein one of rectangular sealing lines dividing said air bags is formed by two parallel sealed parts putting a non-sealed area between them and V-shaped notches making serve a double purpose of separating and tearing the air bags are formed in the non-sealed area.

2. A cushioning material made of heat-fusible laminated film as defined in claim 1, further comprising a plurality of cutouts or V-shaped notches for separating and tearing the air bags formed continuously or in a given space to at least one side edge of said laminated film.

3. A cushioning material made of heat-fusible laminated film as defined in claim 1, further comprising a plurality of cutouts or V-shaped notches for separating and tearing the air bags formed continuously or in a given space to at least one side of each air bag.

4. A cushioning material made of heat-fusible laminated film as defined in claim 1 wherein said V-shaped notch is comprised of a perforated line.

* * * * *